United States Patent [19]

Green et al.

[11] Patent Number: 5,307,327
[45] Date of Patent: Apr. 26, 1994

[54] MOUNTING ASSEMBLY FOR AUTOMOTIVE AUDIO COMPONENTS

[75] Inventors: Dewayne E. Green, Winchester, Tenn.; Steven F. Selby, Huntsville, Ala.

[73] Assignee: Chrysler Corporation, Highland Park, Mich.

[21] Appl. No.: 998,252

[22] Filed: Dec. 24, 1992

[51] Int. Cl.⁵ ............................................. G11B 33/00
[52] U.S. Cl. ........................................ 369/12; 369/10; 369/11; 361/814; 248/27.1
[58] Field of Search .................... 369/10, 11, 12, 75.1; 174/50; 181/148; 312/8.12, 8.14, 9.42; 361/231, 814; 24/295, 297; 248/27.1

[56] References Cited

U.S. PATENT DOCUMENTS

| | | | |
|---|---|---|---|
| 3,763,332 | 10/1973 | Race | 369/10 |
| 4,365,280 | 12/1982 | Crosetti et al. | 369/10 |
| 4,477,127 | 10/1984 | Kume | 312/8.12 |
| 4,623,110 | 11/1986 | Kanari | 248/27.1 |
| 4,699,341 | 10/1987 | Ponticelli | 248/27.1 |
| 4,874,110 | 10/1989 | Klein et al. | 369/10 |
| 5,245,511 | 9/1993 | Watanabe | 361/814 |

FOREIGN PATENT DOCUMENTS 1311494 12/1989 Japan .................................... 369/10

*Primary Examiner*—Robert J. Pascal
*Assistant Examiner*—Tan Dinh
*Attorney, Agent, or Firm*—Beverly M. Bunting

[57] ABSTRACT

Most motor vehicles contain an audio such as a radio, cassette player or compact disc player. A housing generally having a box-like shape and an open end surround the actual hardware. A cover fits over the open end of the housing. The present invention provides a positive means for attaching and holding the front cover to the housing. A lip section of the cover is tightly held between upper and lower tabs integral with the housing. The interference fit created by the tabs tends to reduce the possibility of annoying rattling or buzzing sounds during vehicle operation due to a loose fit of the cover onto the housing.

9 Claims, 2 Drawing Sheets

MOUNTING ASSEMBLY FOR AUTOMOTIVE AUDIO COMPONENTS

BACKGROUND OF THE INVENTION

1. Field of the Invention

The present invention relates generally to audio components primarily intended for use in a motor vehicle, and more particularly to a mounting means for attaching the front cover of an audio component to the housing surrounding it.

2. Description of the Related Art

Audio components such as a radio, cassette player or compact disc player, or a combination of these components, has become a standard feature on a motor vehicle. Typically, the front cover is made from a plastic material and the housing protecting the actual circuitry, is made from metal. The housing is essentially a box enclosed on all sides and open in the front. The front cover fits over the front opening, and may be held in place with fasteners. Another means of holding the front cover in place is a formed metal cover that attaches to the housing and is held by tabs integral with the housing that bend over the adjoining part. However, this does not always provide a tight fit between the front cover and the housing, resulting in undesirable noises stemming from the operation of the vehicle, especially over bumpy roads. The present invention uses specially formed tabs integral with the housing to create an interference fit by rigidly holding the front cover onto the housing and preventing buzzes and rattles during vehicle operation.

SUMMARY OF THE INVENTION

The present invention provides a mounting means for attaching the front cover of an audio component intended for installation in a motor vehicle to its housing. The mounting is accomplished by a multiplicity of tabs formed in the housing and extending along at least one edge of the housing. The tabs may alternate, with a lower tab having a "C-Shaped" channel running parallel to a free edge of the housing. The upper tab extends outwards a distance before bending upwards approximately 90 degrees, turning into an inverted "J-Shaped" channel running parallel to a free edge of the housing and having a leg extending perpendicular from the lower section of the "J".

The front cover has a protruding lip located along its perimeter and perpendicular to the cover. The front cover is assembled onto the housing in such a manner that the lip fits between the upper and lower tabs of the housing. The upper tab provides a positive stop for locating the front cover; and the upper and lower tabs in combination provide for an interference fit between the cover and the housing to prevent rattling or buzzing during motor vehicle operation.

It is one object of the present invention to provide for a mounting of a cover onto a housing.

It is yet another object of the present invention to eliminate potential buzzes and rattles due to an interference fit between the cover and the housing.

It is a further object of the present invention to reduce costs and improve methods of assembly.

Other objects, features and advantages of the present invention will become more fully apparent from the following description in light of the accompanying drawings.

DESCRIPTION OF THE PREFERRED EMBODIMENT

Figure 1:
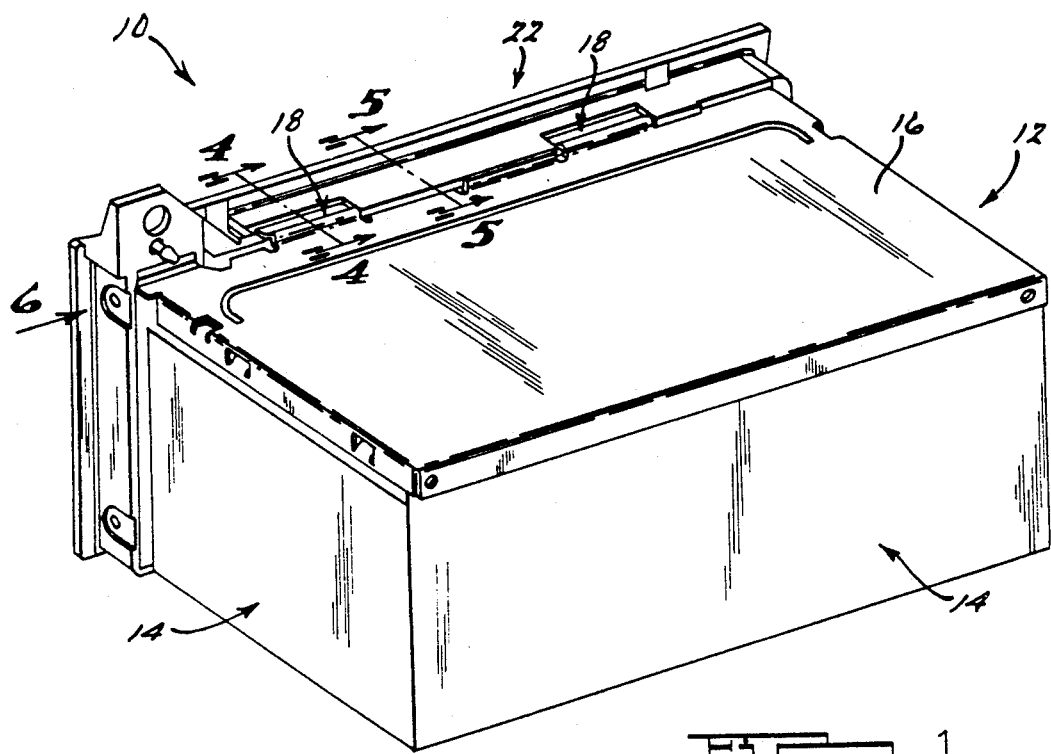
FIG. 1 is a perspective view of the housing with the cover.

Referring to FIG. 1, the preferred embodiment of a radio assembly 10 is shown. It is contemplated that this invention could also be used with other types of audio components such as a cassette player or a compact disc player. The radio assembly 10 includes a housing 12 that serves as protection for the internal radio components ( not shown but well known in the art) and a front cover 22 that protects the internal radio components and also serves a decorative purpose. It should be appreciated that in this embodiment the cover 22 is formed from plastic and the housing 12 from a metal material.

The housing 12 is comprised of a plurality of interconnected side panels 14 generally forming a box shape that is open on at least one end resulting in at least one free edge. It is contemplated that the top side panel 16 can be fabricated separately from the adjoining side panels 14, and all the panels can be joined by some means such as welding, tabs or screws to form the housing 12. In the preferred embodiment, extending from a free edge of the top side panel 16 are a series of tabs, consisting of at least one upper tab 18 and at least one lower tab 20. The particular ratio of upper tab 18 to lower tab 20 is dependent upon available space and retention considerations. In this example the tabs alternate. It is further contemplated that a free edge of the other side panels 14 could have such tabs.

Figure 2:
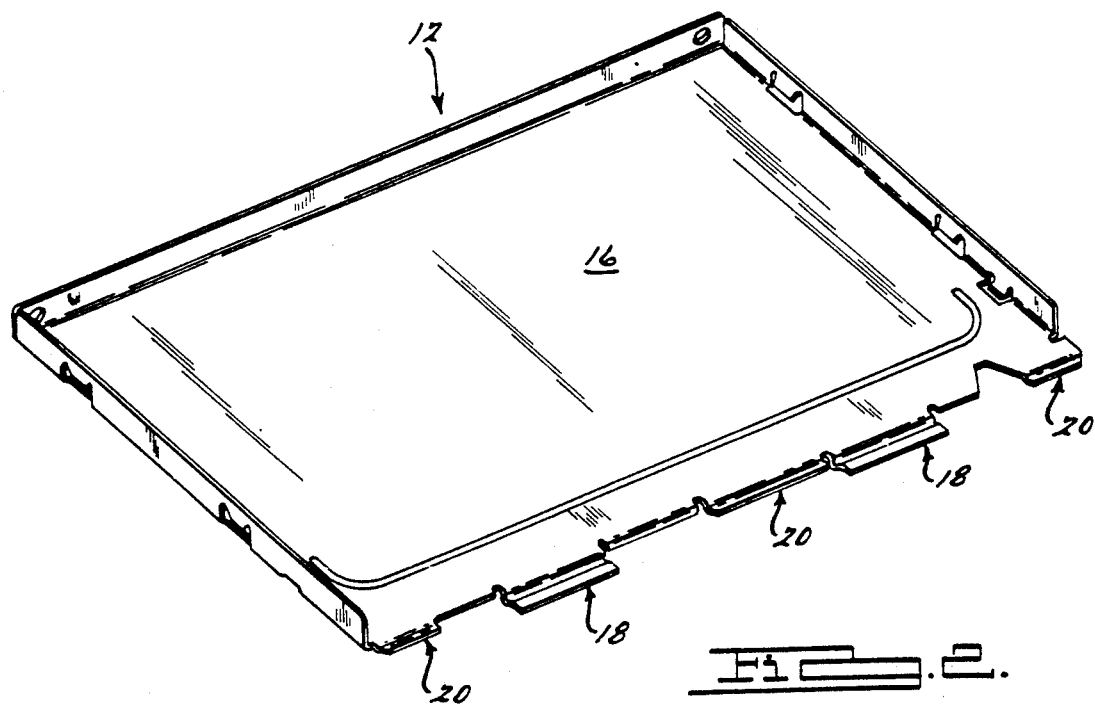
FIG. 2 is a perspective view of the top side panel.

Referring now to FIG. 2 a perspective view of the top side panel 16 is shown, including the protrusion of the tabs from a free edge of the top side panel 16. In this example, the tabs are a part of the top side panel 16 and formed using progressive stamping techniques commonly utilized in the metal-forming industry.

Figure 3:
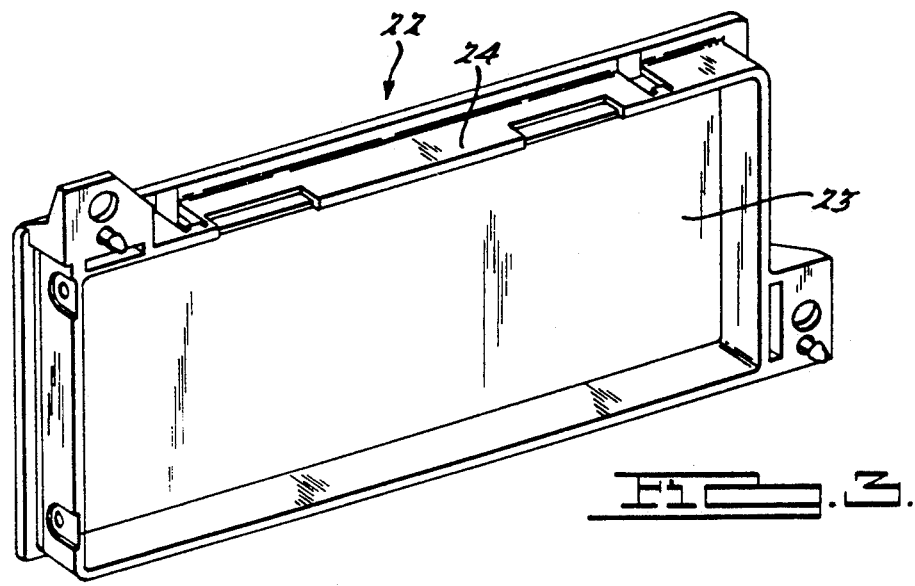
FIG. 3 is a perspective view of the cover.

In FIG. 3, a perspective view of the front cover 22 is shown. The primary purpose of the cover 22 is decorative, however, it also protects the internal radio components contained within the housing 12. A lip 24 for positioning the cover 22 onto the housing 12 extends along the perimeter of the cover 22, and is perpendicular to the face 23 of the cover 22.

Figure 4:
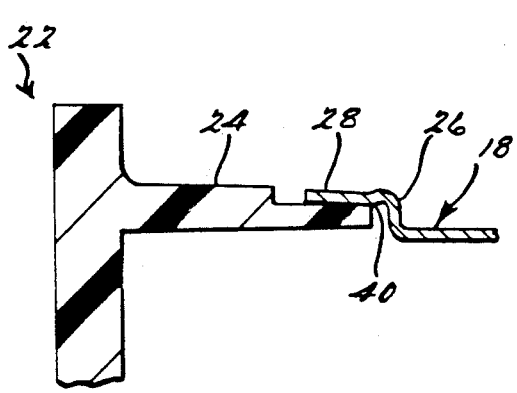
FIG. 4 is a side view of the upper tab and the cover.

The configuration of the upper tab 18 is shown in FIG. 4. The upper tab 18 is essentially an extension of the top side panel 16. The width and length of the upper tab 18 is dependent upon several factors, including but not limited to the length of the top side panel 16, the amount of retentive force required to rigidly hold the cover 22, and the dimensions of the surface to be retained, in this case the lip 24 of the cover 22.

The upper tab 18 is configured such that it extends out from a free edge of the top side panel 16 a certain distance, bends upwards approximately 90 degrees forming an inverted J-shaped channel 26 extending along the width of the upper tab 18 and having a leg 28 extending approximately 90 degrees from the bottom of the "J". Aside from its retentive capabilities, one function of the upper tab 18 is to serve as a positive stop 40 for locating the lip 24. Therefore, the dimensions of the upper tab 18 including: the length before the first 90 degree bend; of the J-shaped channel 26; and the length of leg 28 depend primarily upon the overall dimensions of the lip 24 in order to obtain an interference fit of the lip 24 when held between the upper tab 18 and the lower tab 20.

Figure 5:
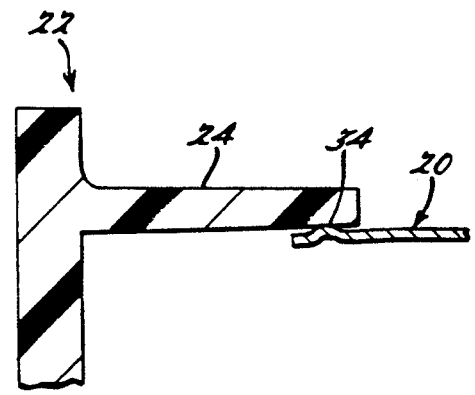
FIG. 5 is a side view of the lower tab and the cover.

Referring now to FIG. 5, a side view of the lower tab 20 is shown in detail. Similarly, the lower tab 20 extends out from a free edge of the top side panel 16, with its width and length determined by the same factors as for the upper tab 18. The lower tab 20 extends out from the free edge of the top side panel 16 a predetermined distance. A C-shaped channel 34 extends along the width of the lower tab 20 beginning a predetermined dimension from the free edge of the top side panel 16. The dimensional criteria for the lower tab 20, including the overall length of the lower tab 20, the width, the location of the C-shaped channel 34, and the shape of the C-shaped channel all depend upon criteria including but not limited to the overall dimensions of the lip 24 in order to obtain an interference fit of the lip 24 when held between the upper tab 18 and the lower tab 20.

Figure 6:
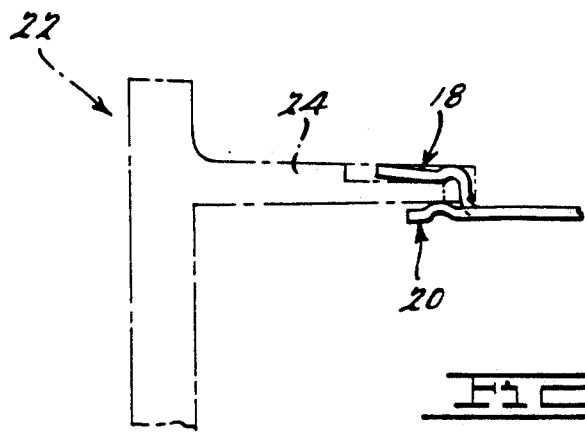
FIG. 6 is a side view of an upper tab and lower tab holding the front cover in place.

Referring to FIG. 6, a side view of an upper tab 18 and lower tab 20 gripping the lip 24 of the front cover 22 is shown. The combination of the upward force exerted by the C-shaped channel 34 and the downward force of the J-shaped channel 26 create the interference fit that holds the front cover 22 to the housing 12, preventing movement or rattling of the front cover 22.

It should be appreciated that while this invention has been discussed in connection with one particular example, those skilled in the art will appreciate that other modifications can be made without departing from the spirit of this invention after studying the specification, drawings and the following claims.

We claim:

1. An audio component housing and front cover comprising:
   a housing having a box-shape with an open end formed from a plurality of adjoining walls;
   said open end having a free edge;
   a front cover;
   said cover having a lip located along a perimeter of said cover and perpendicular to said cover for positioning said cover onto said open end of said housing; and
   said housing having at least one outwardly extending upper tab and at least one outwardly extending lower tab along the free edge of said housing for holding said cover onto said housing.

2. The upper tab and the lower tab of claim 1 comprising:
   a lower tab having a C-shaped channel extending parallel to said free edge of said housing; and
   an upper tab having an inverted J-shaped channel extending parallel to said free edge of said housing and a leg extending from the bottom of the J-shaped channel.

3. The upper tab and lower tab of claim 2, wherein:
   the upper tab and lower tab act together to create an interference fit with said lip to hold said cover onto said housing.

4. The upper tab of claim 3, wherein:
   said J-shaped channel provides a positive stop for locating said cover onto said housing.

5. The cover of claim 1, wherein:
   said cover is made from a plastic material.

6. The housing of claim 1, wherein:
   said housing is made from a metal material.

7. In an audio component for a motor vehicle having a front cover attached to a housing comprising:
   a housing having a box-shape with an open end formed from a plurality of adjoining walls;
   said open end having a free edge;
   a front cover;
   said cover having a lip located along a perimeter of said cover and perpendicular to said cover for positioning said cover onto said open end of said housing;
   said housing having at least one outwardly extending upper tab and at least one outwardly extending lower tab along the free edge of said housing for holding said cover onto said housing;
   said lower tab having a C-shaped channel extending parallel to said free edge of said housing;
   said upper tab having an inverted J-shaped channel extending parallel to said free edge of said housing and a leg extending from the bottom of the J-shaped channel;
   said lip of said cover fitting between said upper tab and lower tab, whereby said tabs act together to create an interference fit with said lip to hold said cover onto said housing; and
   said J-shaped channel providing a positive stop for locating said cover onto said housing.

8. The cover of claim 7, wherein:
   said cover is made from a plastic material.

9. The housing of claim 7, wherein:
   said housing is made from a metal material.

* * * * *